United States Patent
Das et al.

(10) Patent No.: US 6,333,631 B1
(45) Date of Patent: Dec. 25, 2001

(54) CANTILEVERED MANIPULATOR FOR AUTONOMOUS NON-CONTACT SCANNING OF NATURAL SURFACES FOR THE DEPLOYMENT OF LANDMINE DETECTORS

(75) Inventors: Yogadish Das; Kevin Russell, both of Medicine Hat; Nenad Kircanski, North York; Andrew Goldenberg, Toronto, all of (CA)

(73) Assignee: Minister of National Defence of Her Majesty's Canadian Government, Toronto (CA)

( * ) Notice: Subject to any disclaimer, the term of this patent is extended or adjusted under 35 U.S.C. 154(b) by 0 days.

(21) Appl. No.: 09/263,060

(22) Filed: Mar. 8, 1999

(51) Int. Cl.$^7$ ........................................... G01V 3/08
(52) U.S. Cl. ..................... 324/326; 324/337; 250/392
(58) Field of Search ............................ 324/326, 329, 324/337, 345; 376/154, 159; 250/392

(56) References Cited

U.S. PATENT DOCUMENTS

| | | |
|---|---|---|
| 4,021,725 | 5/1977 | Krikland . |
| 5,452,639 | 9/1995 | Aulenbacher et al. . |
| 5,680,048 | 10/1997 | Wollny . |
| 5,712,441 * | 1/1998 | Grunewald ............................ 89/1.13 |
| 5,869,967 | 2/1999 | Straus . |
| 5,942,899 * | 8/1999 | Shrekenhamer ..................... 324/326 |
| 6,026,135 * | 2/2000 | McFee et al. ........................ 376/159 |

OTHER PUBLICATIONS

A. Carruthers, R. Eirich, Y. Das and A. Kramer, "Project JINGOSS–a tele–operated metallic mine detector (U)", 1993 DND Workshop on Advanced Technologies in Knowledge Based Systems and Robotics, Ottawa, Ontario, Canada, Nov. 14–17, 1993.

J.E. McFee and A. Carruthers, "A multisensor mine detector for peacekeeping–Improved Landmine Detector Concept (ILDC)", invited paper, Proc. SPIE Conference on Detection and Remediation Technologies for Mines and Mine–Like Targets, vol. 2765, Orlando, Florida, Apr. 9–12, 1996.

B.M. Cain and T.V. Meidinger, "The Improved Landmine Detection System", Proc. IEE Conference on Detection of Abandoned Landmines, Edinburgh, United Kingdom, Oct. 7–9, 1996.

T. Hanshaw and D.M. Reidy, "Operational Standoff Mine Detection: Its Technology and Application", Proc. SPIE Conference on Detection and Remediation Technologies for Mines and Mine–Like Targets, vol. 3079, Orlando, Florida, Apr. 21–24, 1997.

T.J. Gorman, "Analysis of sensor integration of the Integrated Ground Mobile Mine Detection Testbed (IGM-MDT)", Proc. SPIE Conference on Detection and Remediation Technologies for Mines and Mine–Like Targets, vol. 3079, Orlando, Florida, Apr. 21–24, 1997.

* cited by examiner

*Primary Examiner*—Glenn W. Brown
*Assistant Examiner*—S. Zaveri
(74) *Attorney, Agent, or Firm*—Millen, White, Zelano & Branigan, P.C.

(57) ABSTRACT

Apparatus and method is provided for performing detailed mine detection over variable terrain. An articulated robotic scanner comprises an articulated arm mounted to any vehicle such as a robot. One or more mine detectors mounted at the end of the arm. The arm operates autonomously to repetitively sweep the mine detector in ever forward advancing side-to-side arcs over the terrain. The vehicle can operate autonomously or be tele-operated. The position of the mine detector is monitored and known with respect to a known coordinate system. Sensors measure their position relative to the ground and relative to known co-ordinates of the mine detector. A controller determines the relative position of the ground and the mine detector and dynamically adjusts the mine detector's position to maintain a constant separation over variable terrain without ever contacting the ground or objects thereon.

22 Claims, 6 Drawing Sheets

CANTILEVERED MANIPULATOR FOR AUTONOMOUS NON-CONTACT SCANNING OF NATURAL SURFACES FOR THE DEPLOYMENT OF LANDMINE DETECTORS

FIELD OF THE INVENTION

The invention relates to an apparatus and process for the detection of mines. More specifically a robotic vehicle is provided with an articulated arm for supporting mine-detecting and range-finding sensors.

BACKGROUND OF THE INVENTION

A number of technologies have been applied to the ground-based detection of landmines. In the simplest instance is the individual armed with only a hand-held prodder for probing the ground and relying upon their experience to gauge the level of hazard associated with a contacted object. Hand-held electronic mine detectors are an improvement in but, the proximity of the operator to the detector still presents a risk. At the other extreme are complex and expensive remote-controlled vehicles with sensor arrays preceded by a preconditioning flail vehicle to remove anti-personnel mines. These vehicle mounted sensor detectors are ideal for level terrain, particularly road services.

Vehicle-mounted detectors are rapid but are expensive and operate poorly in irregular and generally difficult terrain and tend to utilize at least one sensor which contacts the ground which can trigger a mine if not pre-cleared. Hand-held detectors are intended for and are used in terrain that vehicle-mounted detectors cannot reach.

It is known that in order to decommission any terrain and render it safe for passage of personnel or resumption of regular human activity, all landmines must be removed. This typically needs to be accomplished with painstaking and hazardous hand-work.

Hand-held mine or metal detectors typically comprise a component box with a handle, a rigid shaft extending towards the ground, and a sensor located at the end of the rigid shaft. The operator typically holds the detector used by the handle and swings the sensor over the ground in a left right sweeping action as the operator walks forward. The advantages of the hand-held detectors include the ability to sweep the ground profile with the detector head spaced closely from the ground for optimal detection, yet the operator strives to prevent contacting either the ground or any objects on or in the ground. The operators shoulder, arm and wrist provide great flexibility in maintaining this sensor spacing. This flexibility permits a human operator to very carefully and precisely sweep and area regardless of its terrain.

Further, the operator is able to vary the width of the sweep in order to adapt to a particular situation or terrain. The disadvantages include is that the hand held method is slow, personnel intensive, tiring, hazardous and obviously stressful for the operator.

It is an objective therefore to provide a mine detection system which implements the flexibility of the hand-held system, provides faster and positive detection of mines and incorporates some of the safer and more rapid mechanized scanning capabilities of the vehicle mounted systems.

SUMMARY OF THE INVENTION

Generally, a small, and simple articulated robotic scanner is provided which is capable both of performing the effective non-contacting and efficient ground-sweeping technique usually performed by human personnel and hand-held mine detectors, yet does so Without the imposition of fatigue and risk upon personnel. The apparatus, while more complex than either a hand prodder or hand-held metal detector, is significantly less expensive or complex than the multisensor, vehicle-mounted apparatus. Additionally, it can access and decommission terrain that the larger vehicles cannot.

Generally, the robotic scanner comprises an articulated arm having one or more mine detectors mounted at its distal end. The arm is mounted to any locomotion device, such as a small robot. The arm is used in an automatic or semi-automatic fashion for repetitively sweeping the mine detector in ever forward advancing side-o-side arcs over the terrain. The sensors are maintained in closely spaced relationship to the ground for optimal mine detection. The spacing of the detector to the ground is determined with a combination of terrain range-finding sensors and a controller for maintaining the relative position of the ground and the mine detector. Accordingly, while the mine detector is swept over the terrain, its position is dynamically adjusted to maintain a constant separation from the ground without contacting the ground or any objects.

In a broad apparatus aspect, mine-detecting apparatus is provided for mounting to a vehicle travelling forward to traversing the ground comprising:

a detector arm connected to the vehicle at one end and to a mine detector at the other;

a joint having two or more rotational axes for connecting the detector arm to the vehicle, said joint being robotic-actuated for enabling tilt and side-to-side panning movement of the detector arm;

range-finding sensors for determining the distance of the range-finding sensors to the ground ahead of the panning mine detector;

positional sensors for tracking the position of the mine detector a first controller for analyzing the range-finding sensors and positional sensors for determining the relative location of the mine detector and the ground; and a second controller for dynamically adjusting the tilt of the detector arm and position of the mine detector so as to continually ensure it is spaced from the ground as it is panned over the ground.

In a preferred embodiment, the mine detector is a metal detector and accordingly, the range-finding sensors are supported on a second arm for separating the potentially metal-containing range-finding sensors from the metal detector. More preferably, the second arm can be repositioned as necessary to positioned it above, to the side and ahead of the panning metal detector.

Further, it is preferable to use two or more range-finding sensors such as a laser range-finder and ultrasonic sensors in combination to improve confidence levels and respond to a greater number of environmental factors. More preferably, control is enhanced if the detector arm is extendible for performing a series of side-to-side pans rather than continually repositioning the vehicle.

The apparatus enables practice of a novel method of mine detection broadly comprising the steps of providing a vehicle having an articulated member mounted to the vehicle and having a mine detector mounted at the far end;

continuously determining the spacing between the mine detector and the ground;

actuating the member to pan the mine detector laterally from side to side to scan a arcuate region; all the while adjusting the position of the mine detector so as to maintain a space between the mine detector and the ground; and advancing the articulated member as necessary to scan a new arcuate region.

DETAILED DESCRIPTION OF THE PREFERRED EMBODIMENT

Figure 1:
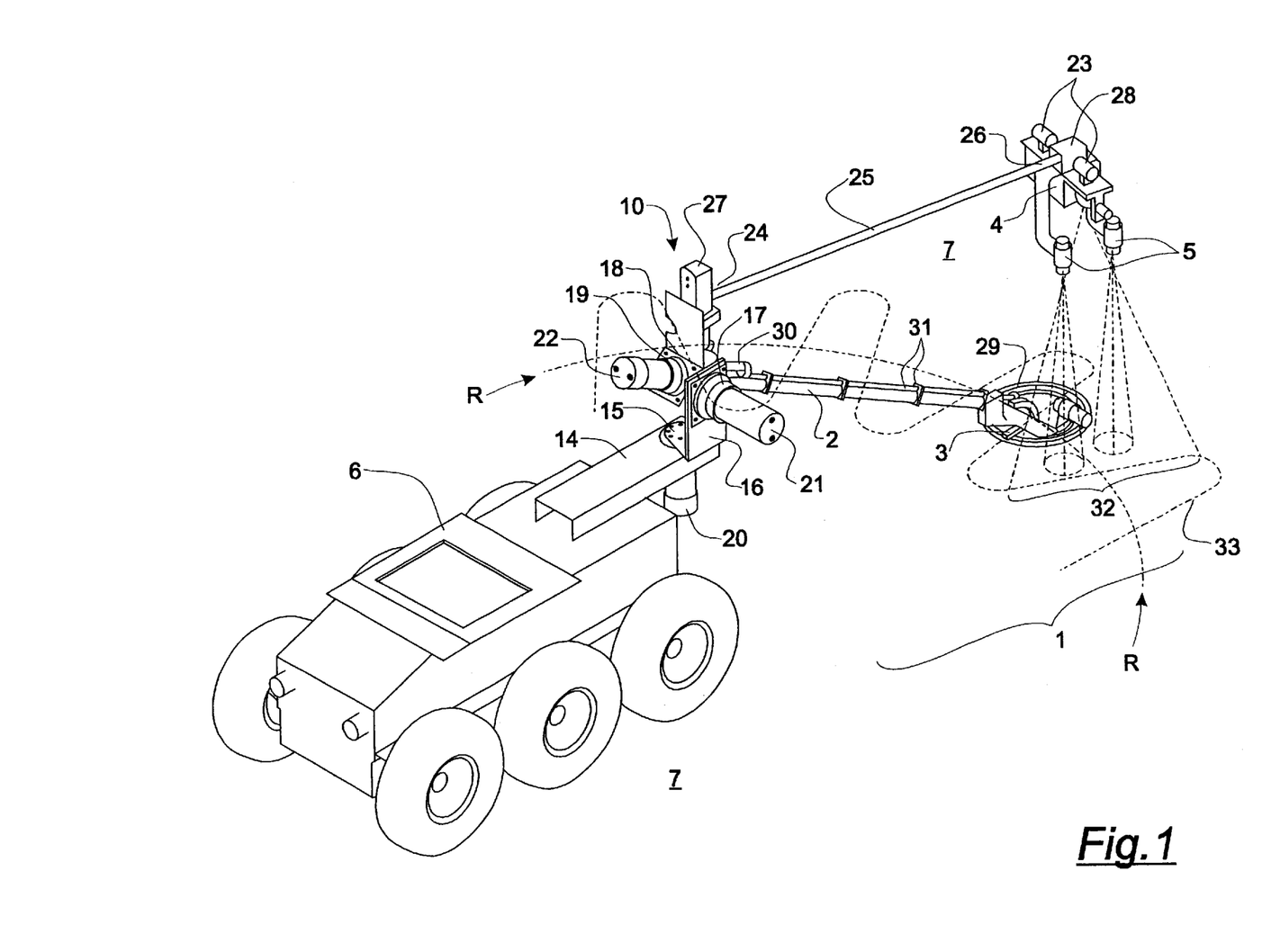
FIG. 1 is an isometric view of a robotic scanner comprising a small tele-operated vehicle having both an articulated, mine detector supporting arm and a terrain mapping sensor-supporting arm mounted thereto, the arm shown panning in a left-to-right direction.
Figure 2A:
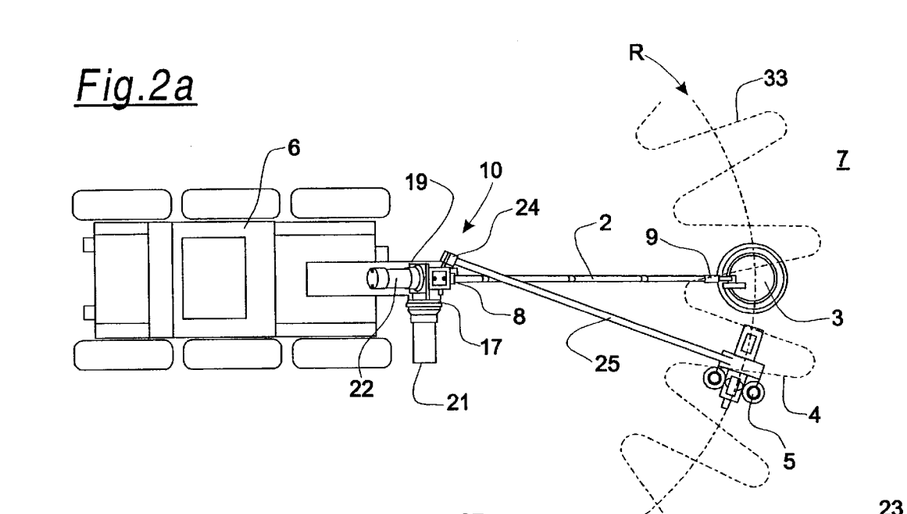
FIGS. 2a, 2b and 2c present top, side and front orthographic views of the robotic scanner of FIG. 1.
Figure 2B:
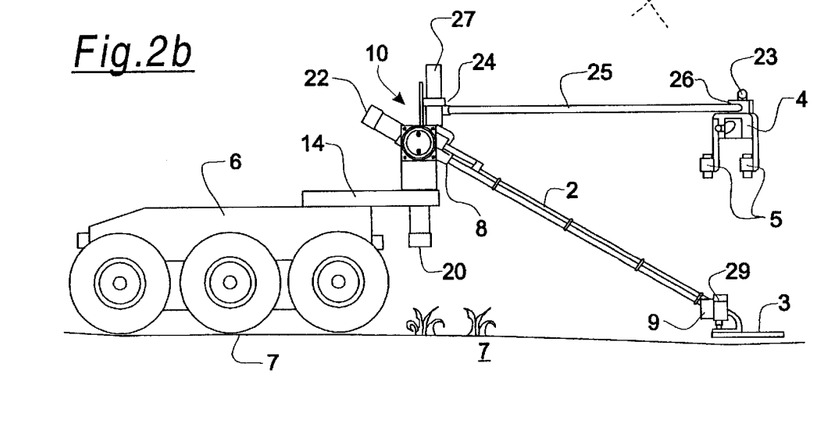
Figure 2C:
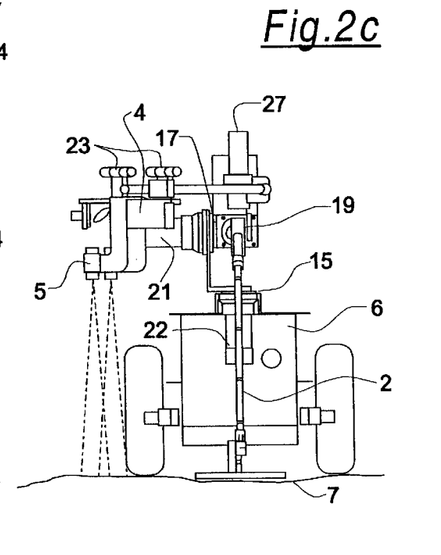

Having reference to FIGS. 1 and 2, a robotic scanner 1 comprises a detector supporting arm 2 with one or more mine detectors (a metal detector 3 shown), and one or more range finding sensors (two types shown, a laser 4 and ultrasonic 5), all mounted to a wheeled vehicle 6 which traverses the ground 7.

The vehicle 6 comprises a small chassis supported on wheels having onboard data communication and other electronics, a computer and a power system (details not shown).

The detector arm 2 utilizes a slender nonmetallic member connected at one proximal end 8 to the vehicle 6. The mine detector 3 is connected and supported at the other distal end 9 of the detector arm 2. The detector arm 2 is manipulated in three dimensions using a multiple degrees of freedom (DOF) joint 10 for optimal positioning of the detector 3 precisely with respect to the ground 7 ahead of the vehicle 6.

Figure 4:
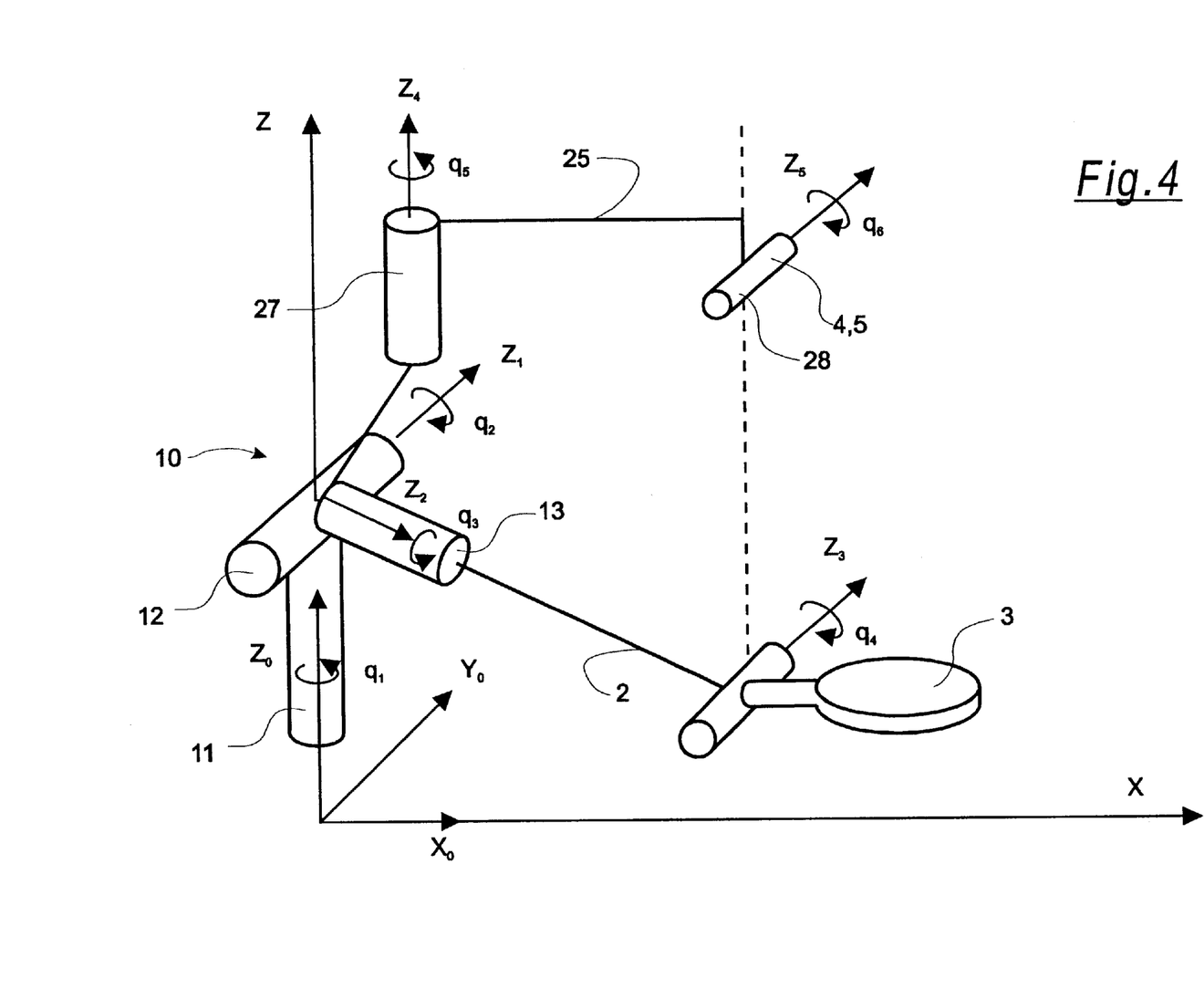
FIG. 4 is a schematic representation of the kinematic structure of the detector and LRF arms and associated sensors.

In its simplest configuration and having reference to the kinematic model of FIG. 4, the proximal end 8 of the detector arm 2 is fitted with the multi-DOF joint 10 including a turret 11 having rotational axis z0 for permitting left and right panning arm 2 action, and a shoulder 12 having a rotational axis z1 for tilting the arm 2 up-and-down. A roll axis 13 for rotation about the z2 axis of the detector arm 2 is optionally provided for improving the tracking of undulating terrain 7. The multi-DOF joint 10 is a spherical joint having a common 3-axis joint center. This spherical configuration simplifies the geometric analysis including the kinematic model and the Jacobian Matrix used to define the detector arm 2.

The joint 10 is physically mounted on the vehicle 6 as follows: a cantilevered support 14 extending horizontally forwards from the vehicle 6 and having a pan pivot 15 located at its distal end; a bracket 16 extending vertically from the pan pivot 15 and having a tilt pivot 17 at its upper end; a horizontal bracket 18 extending horizontally from the tilt pivot 17 and having a roll pivot 19 located therein. The z0, z1, z2 axes of the pan, tilt and roll pivots 15,17,19 all coincide (spherical).

Integrated motor and gearbox actuators 20,21,22 are fitted to each of the three pivots: a pan motor 20 mounted to the cantilevered support 14 to actuate arm 2 panning; a tilt motor 21 mounted to the vertical bracket 16 to actuate tilt; and a roll motor 22 mounted to the horizontal bracket 18 to actuate roll.

The mine detector 3 is panned side-to-side at the end of the arm 2 along an arcuate path R. In one simple mode, the detector 3 is advanced by advancing the vehicle 6. Accuracy can be maximized and vehicle vibration interference can be minimized by optionally extending the length detector arm between vehicle moves.

The mine detector 3 can be one or more detectors including ground penetrating radar (GPR) or metal detectors. In a simple application, a metal detector is used, available as a model F1A6 metal detector from MineLab Electronics Pty, Ltd., Australia, having a digital output. A mine detector for metallic objects is obviously influenced by metal and thus non-metallic structure is used to connect the metal detector 3 to the arm 2 and further, the detector 3 is physically spaced from the metal-bearing vehicle 6 by the non-metallic detector arm 2. Detection of a possible mine is detected as a signal exceeding a pre-determined threshold and the object can be electronically flagged as a possible mine.

Figure 3A:
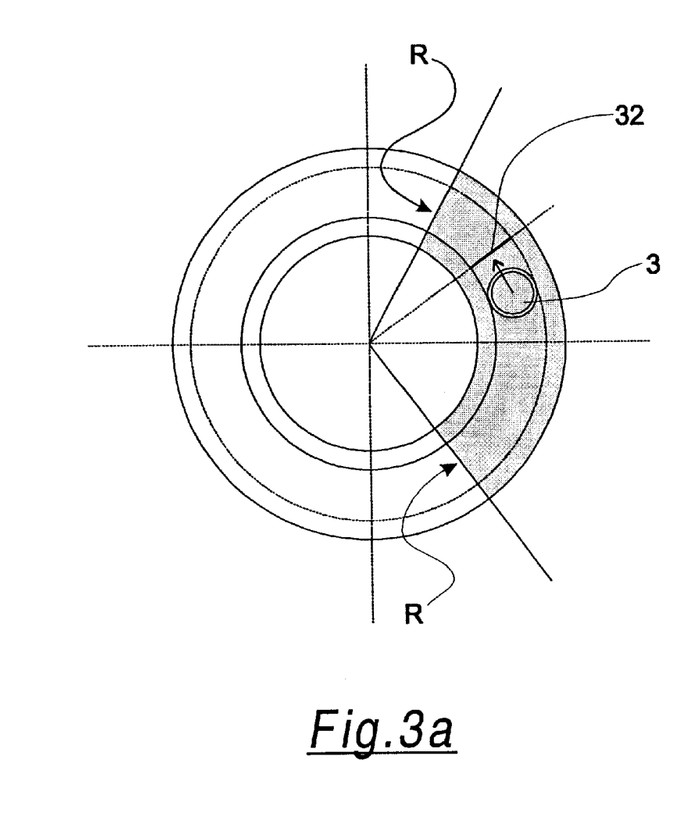
FIGS. 3a and 3b are plan views of the scanned region illustration the LRF scanning line segment preceding the mine detector for right-to-left and the right-to-left panning respectively.
Figure 3B:
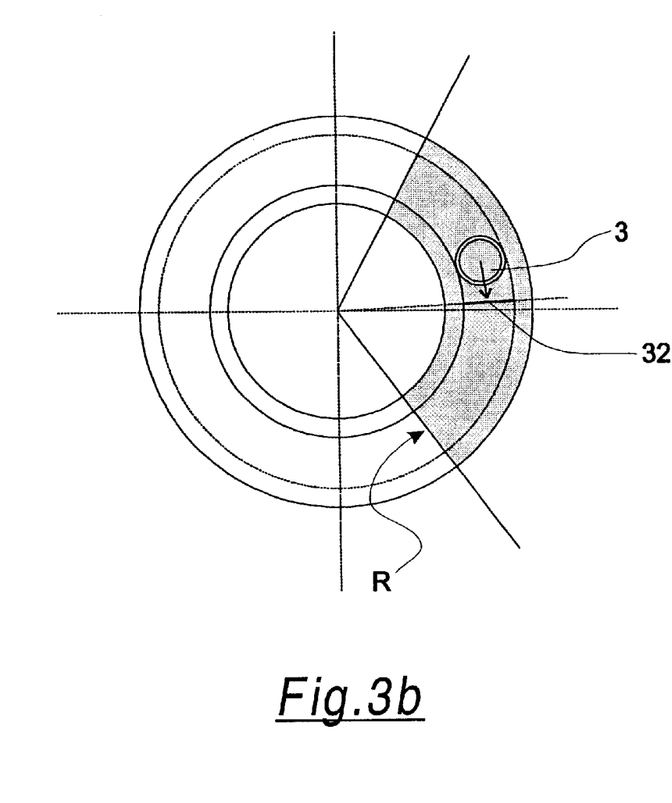

The range-finding sensors 4,5 comprise a downward-directed laser-rangefinder ("laser") such as that available as the 5 mW laser, model AccuRange 4000-LV laser range finder produced by Acuity Research, Inc., Menlo Park, Calif. The 4000-LV has a visible beam for safety purposes. A laser is a pin-point device and thus a rotating mirror (not detailed) is used to enable scanning of a line segment 32 when stationary (see FIG. 3a) or a sinusoidal pattern 33 if moving laterally (see FIG. 2a). By combining tilting and rolling the mirror, it is possible to redirect the laser and obtain distance measurements from other directions without moving the laser in translation (three dimensional mapping).

Additionally, two downward-directed ultrasonic sensors 5 are shown, used as backup for the laser 4 or as redundant sensors for increased reliability. Despite remote operator location, safety issues still suggest that at least two sensors 4,5 should be provided to ensure distance data is available. Suitable ultrasonic sensors 5 are available such as model Sonarange SR3 manufactured by EMS Engineering and Manufacturing Services. Further, two additional ultrasonic sensors 23 are provided which are directed laterally for detecting the presence and distance to side obstacles.

While the geometry is simplified if the range-finding sensors are mounted on the mine detector, special allowances must be made if a metal detector is used as the mine detector 3. To minimize metallic interference, as the laser typically contains metal, it is separated from the mine detector for minimizing interference. The ultrasonic sensors 5 also typically have metal transducers and the large energy pulse can interfere with the metal detector 3 thus they are best located with the laser and not mounted off of the metal detector 3 itself.

Preferably the laser 5 is mounted and supported at the distal end 26 of a non-metallic rangefinder arm 25 (LRF arm) which is located above the detector arm 2. The proximal end 24 of the LRF arm is mounted with a turret 27 to the roll bracket 18, above the spherical joint 10. The LRF turret 27 is actuated with a motor which permits left and right panning action. A wrist joint 28 is fitted at the LRF arms distal end 26 for tilting the LRF sensors 4,5. The axis of the wrist joint 28 is positioned vertically above the mine detector 3 which simplifies the kinematic analysis including the Danavit-Hartenberg's 4×4 transformation matrices.

The LRF turret 27 and arm 25 are panned synchronously with the panning of the detector arm 2.

The mine detector 3 is preferably connected to the detector arm 2 with a controllable joint 29 to adjust pitch. As in hand-held detectors, this not usually a dynamic variable, and typically it will have a preset orientation. An actuator 30 for driving joint 29 is usually associated again with metal. Accordingly, a parallelogram linkage 31 is provided, actuated adjacent the proximal end 8 of the detector arm 2 with a small linear actuator 30, aided further with non-metallic linkage 29 at the metal detector 3.

Combined control of the panning and tilting of the detector arm 2 is determined from measurements of the spacing between the mine detector 3 and the ground 7. It is understood that ground 7 refers to the terrain in general, which can include objects on or below the ground's surface.

The three-dimensional position of the mine detector 3 is known in a local-vehicle coordinate system; established from the measured relative position of the pan, tilt and roll actuators at the spherical joint 10, and the geometry of the arm 2 and mine detector 3. Positional feedback instruments such as optical encoders in the actuators provide the geometry of the joint.

The spacing of the mine detector 3 and the ground 7 is determined using the LRF sensors 4,5. The LRF sensors are directed downwardly to provide substantially instantaneous measurement of their distance from the ground 7. This sensor 4,5 distance information is established in the local-vehicle coordinate system and processed with the known position of the mine detector 3, also known in the local-vehicle coordinate system.

Adjustment of the relative spacing of the mine detector 3 and the ground 7 is performed in real time. The LRF sensors 4,5 determine the location of ground 7, compare that with the known position of the mine detector 3 and its positioned is adjusted accordingly.

In operation, the mine detector is moved cyclically in a left and right, back and forth panning or sweeping action across a scanned region R. Thus, one lateral side of the mine detector 3 alternates between being a leading and trailing edge.

The embedded controller can provide autonomous operation of the panning function wherein back-and-forth panning and incremental vehicle advance is automatic. The vehicle advance can be automatic or human directed.

The terrain 7 which is ahead of the mine detector 3 must be determined or mapped before the mine detector passes over it. In its simplest form, mapping the terrain involves determining the grounds relative elevation along a two-dimensional scanning line segment 32 ahead of the mine detector 3, the line 32 extending at least the projected width of the mine detector 3.

The LRF sensors 4,5 are arranged for sensing the ground 7 ahead of the moving mine detector 3. When the mine detector moves left, the LRF sensors map the terrain to the left, ahead of the moving sensor. When the mine detector moves right, the LRF sensors map the terrain to the right, ahead of the moving sensor. Accordingly, alternate location mapping requirement is preferably implemented by panning the LRF arm 25 so as to position the LRF sensors 4,5 ahead of the mine detector 3 regardless their position in the mine-sweeping cycle.

The LRF sensors 4,5 are expensive and economics favor using one set of LRF sensors 4,5 and moving or directing them ahead of the mine detector 3.

Simply then, in one embodiment, before the mine detector moves to the left, the LRF arm 25 is panned left to a position ahead of the intended mine detector movement. Then, when the detector arm 2 pans, the LRF arm 25 also pans. The LRF sensors 4,5 remain sufficiently in advance of the mine detector 3 so that the terrain 7 can be measured and the geometry processed before the mine detector 3 transverses the measured terrain. Before the mine detector 3 cycles back to the right, the LRF arm is panned right to be repositioned again ahead of the detector 3.

The operation of the present invention is best illustrated in the form of an actual test example.

EXAMPLE

A tele-operated vehicle, model MR-1 from Engineering Services, Inc., Toronto, Ontario was used as the vehicle 6. This vehicle is a commercial form of an explosives robotic vehicle. The vehicle comprised a chassis having six low ground pressure tires and a control box. Data communications and control cable extended between the vehicle and a remote operator control (not shown). The MR-1 had an embedded on board computer and the operator control had a linked host computer. The embedded computer performed the vehicle motion analysis, sensor data analysis and fusion, and mine detector position and trajectory tracking. The techniques for implementing kinematic analysis for determining relative positioning, sensor data fusion and tele-operation of robotic vehicles has been applied in the context of mine detection by those skilled in the art. Neither the kinematic analysis, the principles of sensor fusion or remote operation is discussed herein in any great detail.

An articulated plastic detector arm 2 and a laterally-pivotable plastic LRF arm 25 were mounted to the front of the MR-1 vehicle 6. The detector arm 2 used three separate actuator motors 20,21,22 at its proximal end 8 for implementing arm pan, tilt and roll. Arm roll and mine detector pitch control were not implemented in this example. The LRF arm 25 used an actuator 27 at its proximal end 24 for panning functions.

The actuators 20,21,22 and 27 comprised a DC motor with integrated gears and optical positional feedback encoders (not detailed). Harmonic gearboxes minimized backlash, provided high torque and used a concentric input/output shaft design.

The objectives for the panning speed for the mine detector 3 were set at 1.4 m/s. Accordingly, the pan motor 20 had to produce angular rates of 1 rad/s or 12 rpm at the motor 20. Acceleration requirements were about 5 rad/sec$^2$. The total inertial load was about 5 kg at 1.4 m, or about 10 kgm$^2$ for a maximum moment load at the pan pivot of 50 Nm. A suitable motor was a model RFS-20-3012 available from HD Systems Inc. of Hauppauge, N.Y. Similar design criteria were applied to spec the tile, roll and LRF pan actuators.

Acceleration of the both detector arm 2 and LRF arm 25 were managed using a trapezoidal acceleration curve: linear acceleration; constant velocity; and linear deceleration.

A MineLab F1A6 metal detector 3 was used. The LRF arm 25 supported five sensors: two downward-directed Sonarange SR3 ultrasonic sensors 5 for distance measurement; two laterally-directed ultrasonic sensors 23 for obstacle distance determination and an AccuRange 4000-LV laser 4. The laser 4 itself utilized its integrated rotating mirror to provide LRF tilt rather than a separate joint 28.

The AccuRange 4000-LV laser 4 most closely matched the desired design characteristics being: a sampling frequency of about 100–1000 per second, resolution and accuracy of about 2.5 mm, a focused beam pattern of about 3–5 mm diameter, a range of 0–2 m and have minimal metal content so as to coexist with metal detectors.

Practically, the combination of the design parameters resulted in a mine detector 3 which could be panned back and forth while being automatically raised and lowered to follow the terrain 7 so as to maintain a 5 cm spacing.

A series of indoor and outdoor tests were performed. All test used basically the same procedure. The vehicle 6 was positioned onsite. The arms 2,25 were released from a parked position. The computing system and actuators were initialized and the articulated arm joints 15,17,19 were zeroed or "homed-in". Pan actuator 20 drove the detector arm to a ready position, orthogonal to the front of the vehicle 6. The tilt actuator adjusted the mine detector 3 to within 10 cm of the ground 7.

Figure 5:
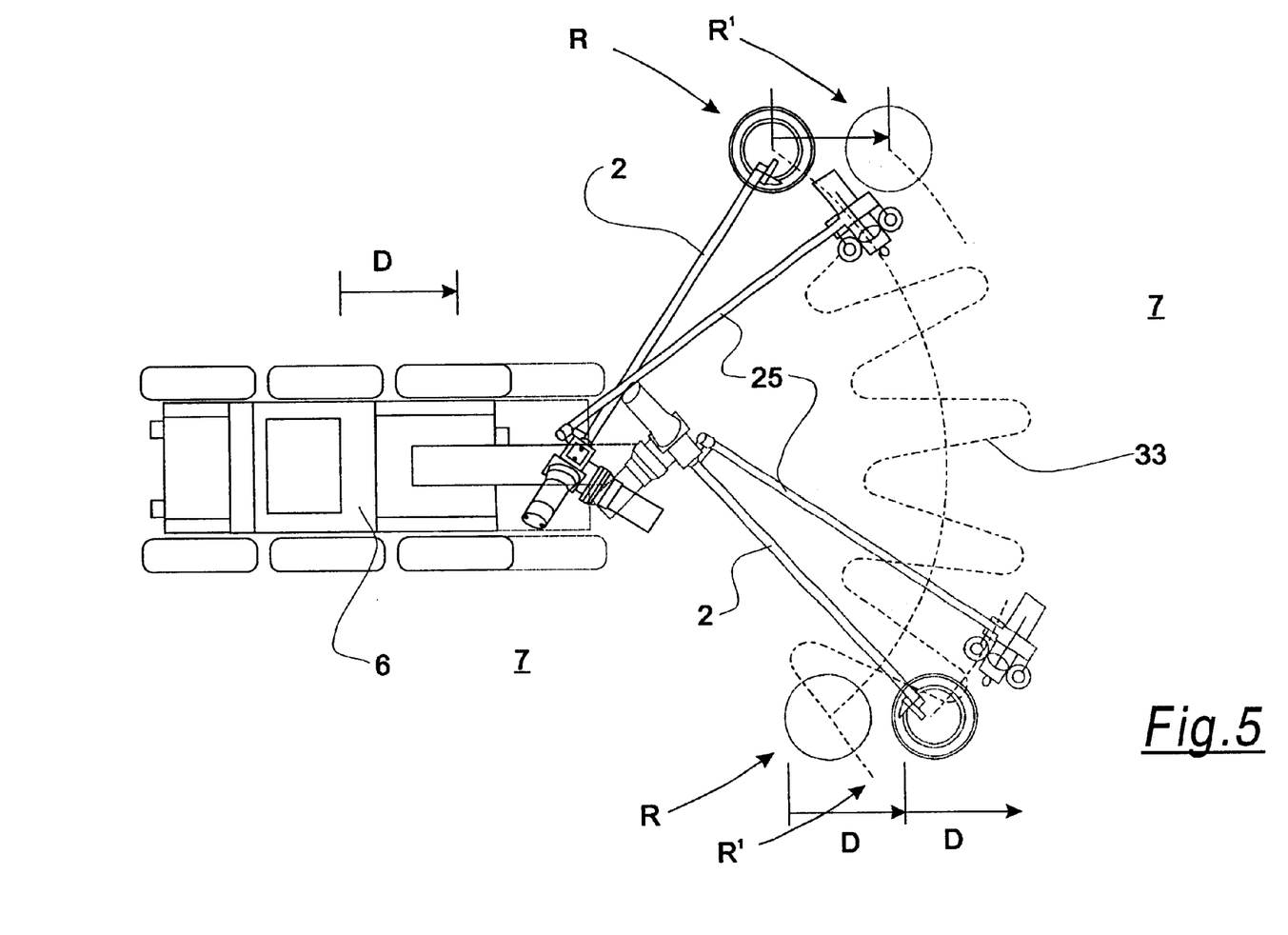
FIG. 5 is a plan view of the vehicle, detector arm and LRF arm. The solids lines illustrate the arms at their leftmost range of motion in preparation to scan right. The hidden lines illustrate the vehicle advanced forward an increment and the arms positioned at their leftmost range of motion in preparation to scan left.

Referring to FIGS. 4 and 5, scanning was commenced. The pan actuator 20 adjusted the turret angle q1 so as to move the detector arm 2 to its range of travel on one side (See FIG. 5 for a left side start) with the LFR arm 25 turret angle q5 adjusted to lead the detector arm 2 by about 15°. The turret shoulder angle q2 was adjusted to space the center of the mine detector 5 cm above the ground.

As shown in FIG. 5, the range of panning travel exceeds the width of the vehicle 6 so as to ensure a mine-free advance path.

Cyclical and continuous panning of q1 and q5 was commenced. After panning each scanned region R, the vehicle 6 was advanced to the next scanning region R', R" . . . .

The laser 4 had a 2600 rpm rotating balanced mirror. The mirror and its optical position encoder were only operated only in one dimension for the example so that only a scanned line segment 32 of terrain 7 was obtained ahead of the mine detector 3. The mirror speed produced a 30 cm scanned line and at the panning speed of 1.4 m/s, the scanned line segment 32 resulted in a sinusoidal pattern 33 which repeated well before the maximum permitted advance of 15 cm of the detector 3.

The laser 4 determined its own distance to the ground 7. The ultrasonic sensors 5 also established their own respective distances to the ground 7.

The three LRF sensors' 4,5 distance data was filtered and a sensor fusion process was used to obtain the distance to the ground 7. The ultrasonic sensors 5 were also used to calculated terrain pitch. All three sensors 4,5 were averaged to calculated distance to the ground 7. Filtering was performed to deal with sensor error in reading challenging terrain surfaces and noise generally. Data for each sensor 4,5 was over-sampled and a number of high and low samples were rejected. The remaining data was averaged. Each sensors average data was subjected to a first-order low-pass filer having a bandwidth at 50 Hz for canceling certain noise. Lastly, pairs of the three filtered sensor readings were compared according to a predetermined threshold. If all pair comparisons were similar, an average of all three readings was taken. If only two compared then an average of the two similar readings was taken. If none are similar then the previous calculated value was taken.

The optical encoders in the two pan and tilt actuators 20,21,22 provided positional data used in the data fusion process.

Using the data obtained and the kinematic relationships of the arms 2,25, detector 3 and sensors 4,5, terrain parameters were calculated including ground elevation, pitch angle and roll angle.

The terrain parameters or data was stored periodically according to a sampling period. The data was stored in a table with a time offset for delayed use when the position of the leading edge of the panning mine detector 3 corresponded to the position the terrain parameters were obtained.

At the end of each cycle, data acquisition was interrupted only long enough for the LRF arm 25 to reset and move to the leading side of the mine detector 3. The terrain data missed during the resetting of the LRF arm 25 for the cycle was interpolated from the termination of the last cycle.

As the desired position of the center of the metal detector 3 was set (spaced 5 cm above the ground 7, orthogonal to the terrain), then the inverse kinematic problem could be solved to obtain the necessary angles for pivots 17, 19 29 to achieve the 5 cm spacing. More particularly, for the known the angles were determined for the shoulder tilt q2, wrist roll q3 and wrist pitch q4.

The embedded controller output the necessary angles to the respective pan, and tilt motors for positioning the detector arm 2 and mine detector 3.

Indoors, the test terrain 7 included artificial and natural objects of varying complexity, which included cardboard, wooden surfaces, and pieces of sod. Terrain profiles included flat through smoothly varying, gently undulating and abrupt.

Outdoors, the terrain 7 included gravel and dirt road surfaces, natural prairie having grass up to 15 cm in height, 15 cm high by 30 cm diameter mounds of dirt and a mud puddle. Additional factors included those affecting the laser 4 such as bright sun and reflective surfaces.

The ultrasonic sensors 5 detected distances reliably in within 10° of normal from shiny surfaces and within 25° of rough surfaces. At distances of 8–40 cm, the resolution was within 1.5 mm. Ripples on water reduced reliability. The sensors' cone angle was 7.2°, having a range of 20–91 cm and a sound frequency of 200 Hz. Ultrasonic pulse firing frequency was over 100 Hz to ensure that, at 1.4 m/s panning speed, samples are obtained at least every 14 mm. As the test used a metal detector 3, the metal content of the ultrasonic sensors was minimized, using aluminum or in this case PVC housings.

Figure 6:
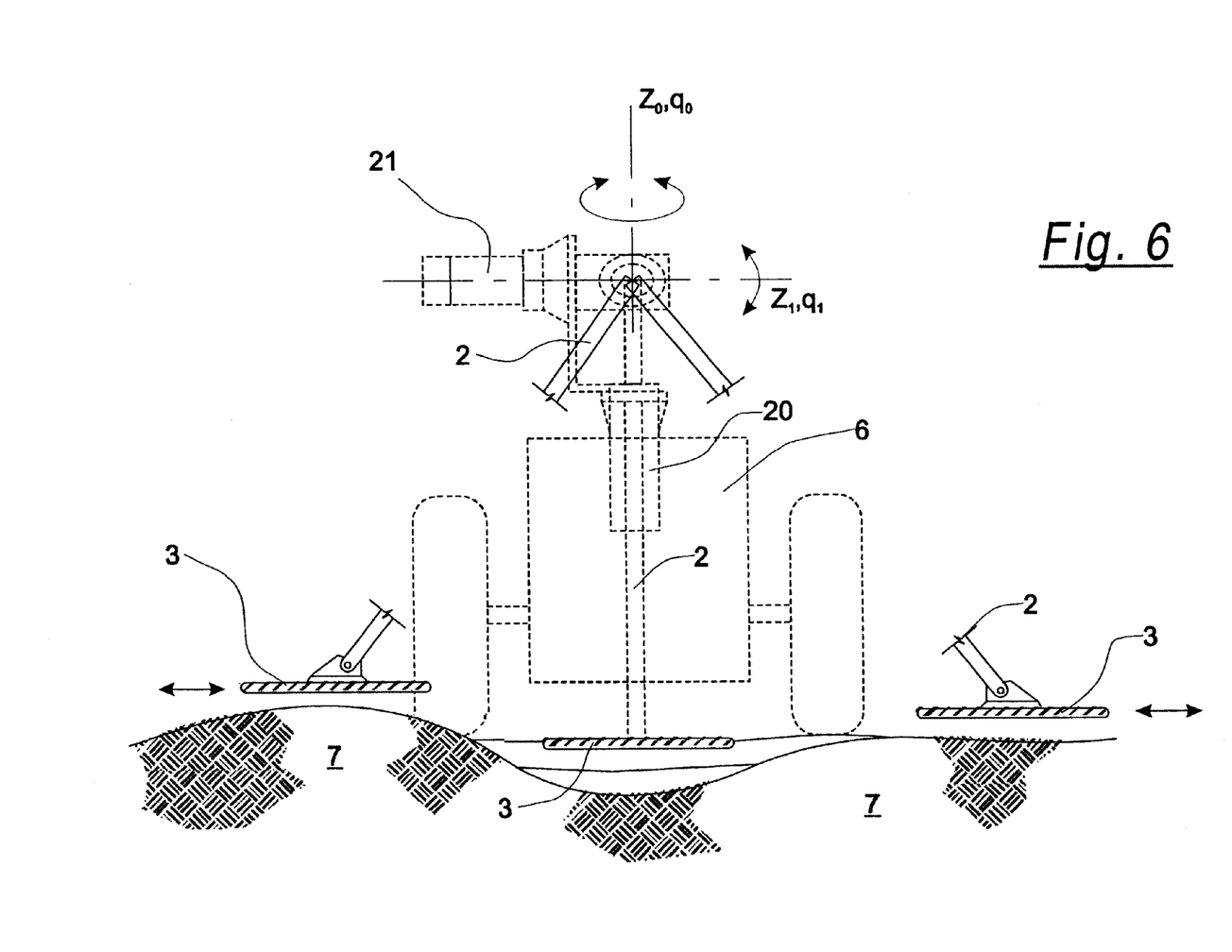
FIG. 6 is a front view showing three snapshots of the mine detector and detector arm during panning while maintaining a fixed spacing over a mound, a water-filled depression and flat ground.

For example, as illustrated in FIG. 6, one of the many tests performed included an outdoor panning mine sweep which included flat ground, a mound and immediately into a puddle filled depression and flat ground again.

As a result, the mine detector 3 was found to satisfactorily negotiate most objects other than abrupt transitions. It is anticipated that enhanced laser operation to include the three dimensional mapping rather than merely the scanned line segment 32 will overcome step changes.

The technique of advancing the vehicle 6 so as to advance the arms 2,25 and mine detector 3 to the next scanning region was crude and more precise arm-extension control should be implemented. The reflective surface of the puddle resulted in variable results including a false reading resulting in a chance contact of the detector 3 with the puddle.

Additional designs and options can be applied to the present invention which include:

improved function of the detector arm such as providing an axial extension capability to permit the mine detector to be moved a short distance along the line of advance without moving the vehicle; and implementation of the wrist pitch joint at mine detector for dynamically adjusting the mine detector pitch angle to smoothly avoid terrain which changes along the line of advance;

implementation of the side-looking sensors for detection and avoidance of side obstacles; and use of video and radar range-finders; and enhanced function of the LRF wherein the scanning mirror can be manipulated laterally so as to improve the scanned line mapping to a full three dimensional mapping ahead of the mine detector for better anticipating sharp changes in terrain and controlling wrist roll maneuvers; and provision of inertial navigation systems or differential global positioning systems for enabling recordation or mapping of the detected object in a ground-based coordinate system for subsequent placement of a trailing confirmatory sensor, a mark or merely for re-location and mine neutralization.

The embodiments of the invention in which an exclusive property or privelege is claimed are as follows:

1. A mine-detecting apparatus supported from a vehicle which traverses the ground comprising:
   (a) first support member having a proximal end pivotally connected to the vehicle and a distal end supporting a mine detector which is moved over the ground;
   (b) a first robotic actuator connected to the first support member and having at least two rotational axes for enabling up-and-down and side-to-side panning movement of the mine detector by pivoting the first support member;
   (c) one or more ground sensors for dynamically determining the spacing of the mine detector from the ground as it moves over the ground;
   (d) a second support member having a proximal end pivotally supported by the vehicle and a distal end for supporting the sensors;
   (e) a second robotic actuator connected to the second support member and having at least one rotational axis for enabling positioning of the sensors relative to the moving mine detector by pivoting the second support member; and
   (f) a controller connected to the first robotic actuator for instructing the first robotic actuator to adjust the first support member so as to dynamically space the mine detector an optimal spacing from the ground as it moves over the ground and connected to the second robotic actuator for instructing the second robotic actuator to pivot the second support arm to position the sensors vertically with respect the ground in advance of the mine detector.

2. The apparatus as recited in claim 1 wherein the first robotic actuator comprises:
   (a) a first pan pivot located between the first support member and the vehicle and having a first pan actuator for panning the first support member; and
   (b) a tilt pivot located between the first support member and the vehicle and having tilt actuator for tilting the first support member.

3. The apparatus as recited in claim 2 wherein the range-finding sensors comprise both a laser and ultrasonic range-finders.

4. The apparatus as recited in claim 1 wherein the sensors comprise:
   (a) one or more range-finding sensors positioned at known three dimensional coordinates relative to the mine detector, said range-finding sensors being directed toward the ground ahead of the mine detector movement for determining values of the distance of the ground from said range-finding sensors; and
   (b) one or more sensors for determining values of the three dimensional coordinates of the mine detector so that the controller can establish measures of the spacing between the detector and the ground over which the mine detector is moving.

5. The apparatus as recited in claim 4 wherein the one or more range-finding sensors comprise a laser range-finder.

6. The apparatus as recited in claim 4 wherein the second robotic actuator comprises a second pan pivot located between the second support member and the vehicle, and a second pan actuator for panning the second support member.

7. The apparatus as recited in claim 6 wherein the second pan actuator pans the second support member so as to re-position the one or more range-finding sensors and direct them at the ground ahead of the mine detector.

8. The apparatus as recited in claim 6 wherein the proximal end of the second member is connected to the first support member so that the second support member is moveable with the first support member.

9. The apparatus as recited in claim 8 wherein the second pan actuator pans the second support member so as to re-position the one or more range-finding sensors and direct them at the ground ahead of the mine detector.

10. The apparatus as recited in claim 9 wherein the one or more range-finding sensors comprise a laser range-finder.

11. The apparatus as recited in claim 9 wherein the one or more range-finding sensors comprise a laser range-finder.

12. The apparatus as recited in claim 1 wherein the vehicle is remote controlled.

13. The apparatus as recited in claim 1 wherein the mine detector is a ground penetrating radar detector.

14. The apparatus as recited in claim 1 wherein the mine detector is a metal detector.

15. The apparatus of claim 14 further comprising:
    a pivot located between the distal end of the first member and the detector;
    a third actuator located at the proximal end of the first member; and
    a non-metallic parallelogram linkage between the actuator and the pivot for tilting the metal detector.

16. A method for detecting mines in or on the ground comprising:
    providing a vehicle having a first articulated member supported therefrom, the first articulated member having a mine detector mounted at a distal end;
    continuously determining the spacing between the mine detector and the ground;
    panning the first articulated member and mine detector laterally from side to side without contacting the ground to scan an arcuate region;

adjusting the position of the mine detector so as to space the mine detector an optimal distance from the ground; and advancing the vehicle as necessary to scan a new arcuate region.

17. The method as recited in claim 16 wherein the spacing between the mine detector and the ground is determined by determining the spacing between the ground and one or more range-finding sensors;

establishing the coordinates of the one or more range-finding sensors in a coordinate system and therefore establishing the location of the ground in the coordinate system;

establishing the coordinates of the mine detector in the coordinate system; and determining the distance between the mine detector and the ground knowing the relative coordinates of the ground and the coordinates of the mine detector.

18. The method as recited in claim 17 wherein the one or more range-finding sensors are located remote from the mine detector.

19. The method as recited in claim 16 wherein the spacing between the mine detector and the ground is determined by providing a second articulated member supported by the vehicle and one or more range-finding sensors being mounted at a distal end so that the one or more range-finding sensors may be panned in an arc substantially the same as that of the mine detector;

panning the second articulate member so that the one or more range-finding sensors determine the distance to the ground ahead of the panning mine detector;

establishing the coordinates of the one or more range-finding sensors and the ground in a coordinate system;

establishing the coordinates of the mine detector in the coordinate system; and determining the distance between the mine detector and the ground knowing the coordinates of the ground and the coordinates of the mine detector.

20. Apparatus for panning a detector over and spaced form undulating ground surfaces, the detector having a predetermined optimal spacing from the ground, the apparatus comprising:

(a) a first support member having an articulated proximal end supported from a vehicle and a distal end supporting the detector which is moved over the ground;

a first robotic actuator associated with the first support member and having at least two rotational axes for enabling up-and-down and side-to-side panning movement of the detector;

one or more sensors for dynamically determining the spacing of the detector from the ground as it moves over the ground;

a second support member having a proximal end supported by the vehicle and a distal end for supporting the sensors;

a second robotic actuator associated with the second support member and having at least one rotational axis for enabling positioning of the sensors relative to the moving detector; and a controller for instructing the first robotic actuator to adjust the first support member so as to dynamically space the mine detector at the optimal spacing from the ground as it moves over the ground and for instructing the second robotic actuator to adjust the second support arm to position the sensors in advance of the detector.

21. The apparatus of claim 20 further comprising:

a pivot located between the distal end of the first member and the detector.

22. The apparatus of claim 21 wherein the detector is a metal detector further comprising:

a third actuator located at the proximal end of the first member; and a non-metallic parallelogram linkage between the actuator and the pivot for pivoting the detector.

* * * * *